United States Patent [19]

Joannou

[11] 3,838,211

[45] Sept. 24, 1974

[54] TEACHING SYSTEM AND DEVICES

[76] Inventor: Constantinos J. Joannou, 2008 Dorval Ave., Ottawa, Ontario, Canada

[22] Filed: Jan. 4, 1973

[21] Appl. No.: 320,851

[30] Foreign Application Priority Data
Jan. 10, 1972  Canada.............................. 132,033

[52] U.S. Cl........................ 178/18, 35/36, 318/568, 346/33 M
[51] Int. Cl.... G08c 21/00, G09b 5/04, G11b 31/00
[58] Field of Search...... 33/1 K, 1 M; 318/568, 628; 179/100.2 MD; 35/36; 346/33 M, 74 M; 178/18, 19, 20; 235/151.11

[56] References Cited
UNITED STATES PATENTS

| | | | |
|---|---|---|---|
| 3,425,140 | 2/1969 | Dillon et al. ............................. | 35/36 |
| 3,582,956 | 6/1971 | Huston et al. ..................... | 346/33 M |
| 3,693,066 | 9/1972 | Friedman et al. ................... | 318/628 |
| 3,733,612 | 5/1973 | Huston et al. ....................... | 318/568 |
| 3,757,187 | 9/1973 | Arai .................................... | 318/568 |

Primary Examiner—Thomas A. Robinson

[57] ABSTRACT

In teaching certain subjects, it is necessary to communicate with the students using drawings as well as voice. Well known devices such as film, video tape and television have been used to automate the teaching process. Such devices, however, are expensive and difficult to use, especially by the teacher. This invention provides a system and devices used to implement the system, which enable automation of the teaching process, and which are relatively inexpensive and easy to use by both the teacher and student. Specifically, the invention pertains to an automated teaching system where a lecture consisting of voice and drawings or sketches and figures can be recorded on magnetic tape by means of an x-y record-reproduce device. The lecture, once recorded, may be duplicated many times and distributed among many students who can reproduce the recorded lecture on similar devices. The graphic information is reproduced on standard ordinary sheets of paper which the students may keep for later reference.

9 Claims, 19 Drawing Figures

TEACHING SYSTEM AND DEVICES

This invention relates to a system and associated devices in which a lecture, including voice and drawings, is recorded on magnetic tape, duplicated, if necessary, and reproduced by students; the graphic information is reproduced on sheets of paper which the students may keep as lecture notes.

The present methods available for recording lectures are well known: films, video tape, closed circuit television, etc. These systems, however, are not very convenient to use, especially by the lecturer or teacher. For instance, to make a film, the lecturer has to have a second person assisting with the camera. Also, in order to make corrections, he has to wait until the film is developed. Video tape is easier to use, but the equipment involved, including the video tape, is quite expensive.

The advantages of my invention over the systems mentioned above are as follows:

the equipment used is relatively inexpensive;

inexpensive medium is used for recording, i.e. ordinary audio tape;

ease of recording and correcting;

the student, after reproducing the lecture, is left with a set of lecture notes, including drawings and sketches, which he may use for reference later.

The disadvantages of the system I propose are that detailed pictures cannot be recorded and also, the rate of transmission of the drawing is relatively slow, i.e. the speed with which the teacher writes. This, in itself need not be a disadvantage, as the students require a lecture to be given slowly for better comprehension.

It is therefore, the object of my invention to provide a system for teaching in which a lecturer (teacher) can record his lecture, which consists of drawings, sketches or figures and voice, on magnetic tape by means of a special record - reproduce device. If necessary, he can duplicate the recording on other magnetic tapes and distribute the tapes to students, who can reproduce the tapes as many times as they wish on similar record - reproduce devices, and listen to the lecturer's voice while they watch the recorded drawings, figures and sketches being drawn by the device. Copies may also be made on phonograph records.

Another object of my invention is to provide the means and devices to implement the object mentioned above.

Another object of my invention is to provide a record - reproduce device which can be used by the lecturer to record on magnetic tape both his voice and his drawings or sketches and enable him to reproduce his recorded lecture immediately after recording, and make corrections as required.

Another object of my invention is to provide a record - reproduce device which reproduces the recorded graphic information on ordinary paper which the students can keep for later reference.

These and other objects of my invention will become more apparent in the detailed descriptions which follow.

In drawings which illustrate embodiments of my invention.

Figure 1:
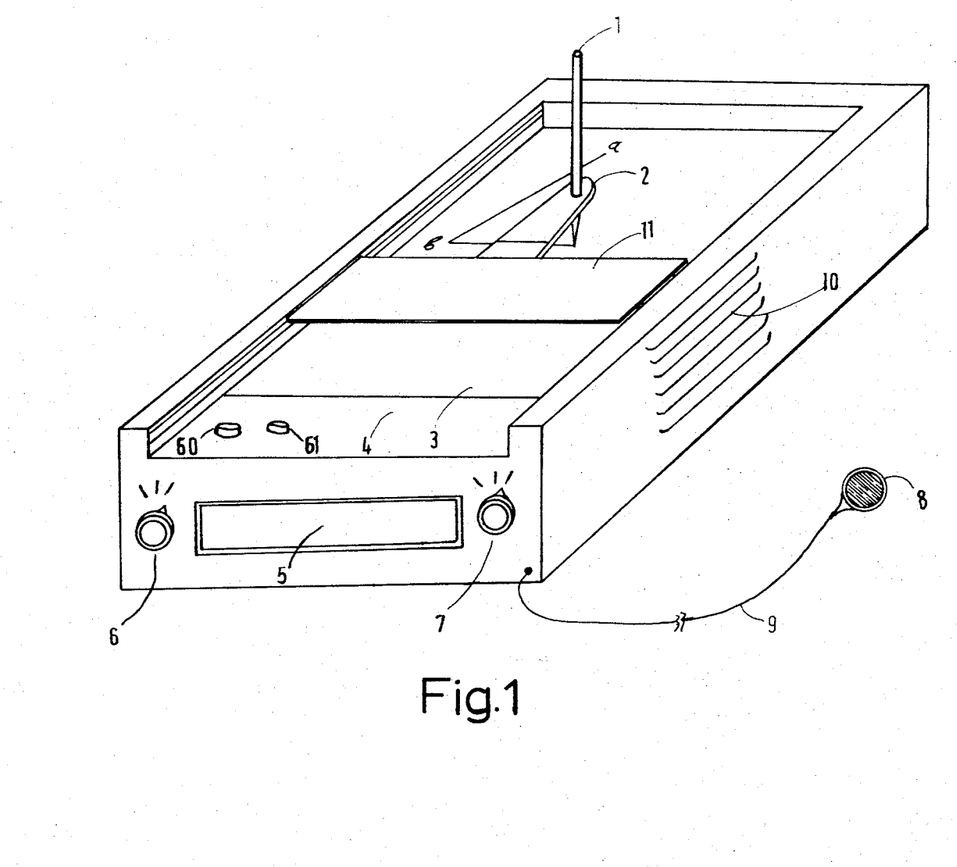
FIG. 1 is a pictorial view of one version of the record - reproduce device.

Referring to the record - reproduce device shown in FIG. 1, stylus 1 is supported by stylus holder 2, which is made of transparent material, and is moveable in the $x$, $y$, and $z$ directions. Paper 3 is held firm by some means on flat surface 4 of the device. The device is equipped with means for recording and reproducing electrical signals on magnetic tape. In FIG. 1, a cassette tape recorder 5 is shown. 6 and 7 are control knobs for controlling the various functions of the device. 8 is a microphone used by the operator to record his voice. 9 is a cable connecting the microphone to the device. 10 is a loudspeaker grill behind which is a loudspeaker for reproducing the voice. 11 is a long plate which is used to cover the linkages which move the stylus holder in the $x$-direction and is also used to support the operator's hand who manipulates the stylus during recording.

Figure 2:
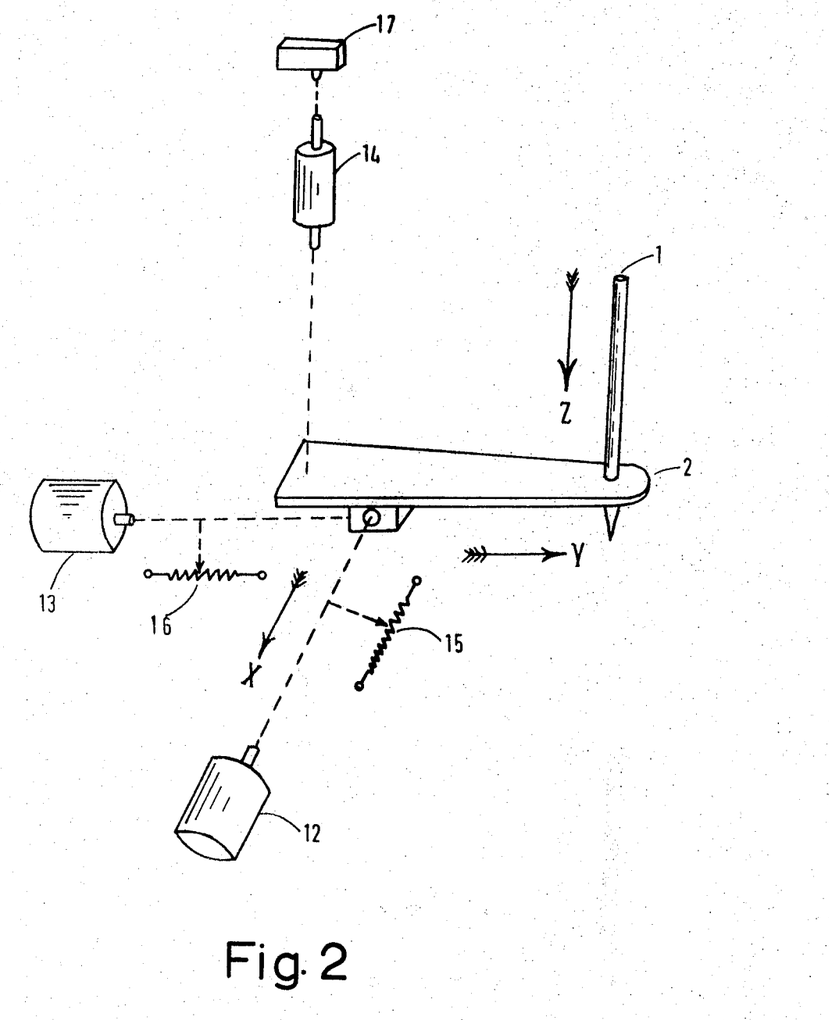
FIG. 2 shows diagrammatically the mechanism which drives the stylus and potentiometers.

FIG. 2 shows diagrammatically the way the stylus holder is connected to two electric motors 12 and 13, via linkages of some sort, in such a way that when motor 12 is energized, the stylus holder moves in the $x$-direction, and when motor 13 is energized, the stylus holder moves in the $y$-direction. Solenoid 14 is arranged so that when energized, it lowers the stylus onto the paper by tilting the stylus holder. Potentiometers 15 and 16 are connected by linkages in such a way that when the stylus holder moves in the $x$-direction, potentiometer 15 is operated and when the stylus holder moves in the $y$-direction, potentiometer 16 is operated. Also connected to the stylus holder by linkages is microswitch 17 which is operated any time the stylus holder is tilted and the stylus touches the paper.

Figure 3:
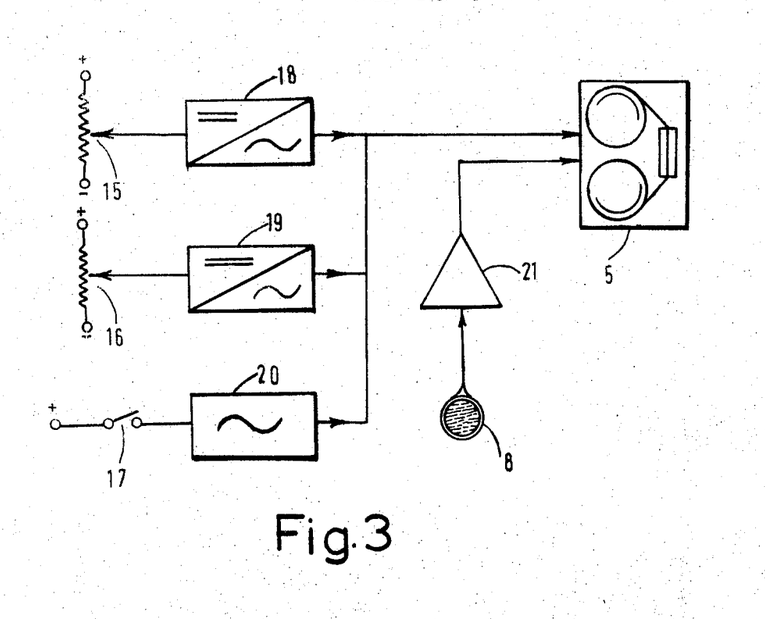
FIG. 3 shows the electrical connections of the device when operating in the record mode of operation.

FIG. 3 shows the electrical components and connections of the basic device when switched to the record mode of operation. Potentiometer 15 which responds to the x-movement of the stylus is connected to a voltage controlled oscillator 18 which produces an AC voltage of which the frequency is determined by voltage at the wiper of potentiometer 15. In a similar manner, potentiometer 16, which responds to the y-movement of the stylus controls the frequency of voltage controlled oscillator 19. Microswitch 17, which is operated by the z-movement of the stylus, turns oscillator 20 "on", when the stylus touches the paper. The AC voltage produced by the two voltage controlled oscillators 18 and 19 and by oscillator 20 are connected to one input of tape recorder 5. Microphone 8 is connected to another input of tape recorder 5 via amplifier 21.

Figure 4:
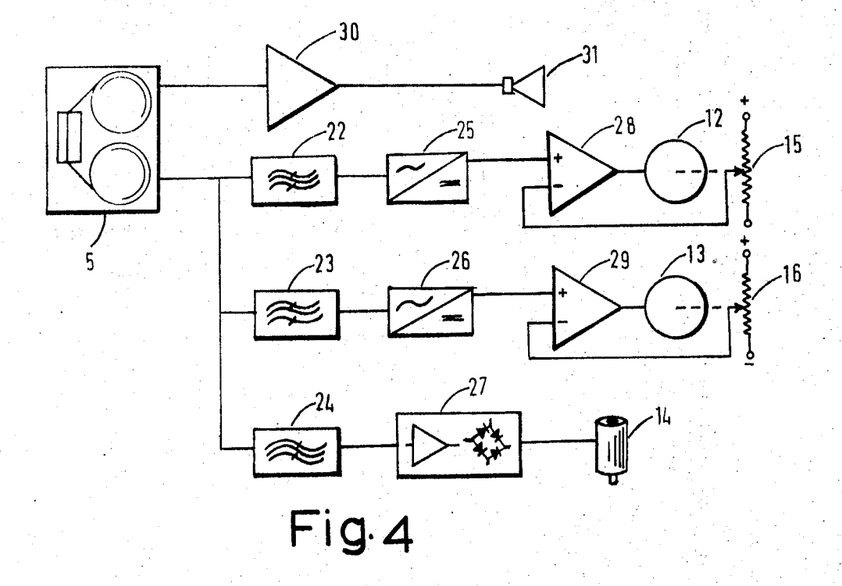
FIG. 4 shows the electrical connections of the device when operating in the reproduce mode of operation.

FIG. 4 shows the electrical connections and components of the device when switched to the reproduce mode. Output signals from tape recorder 5 are separated by filters 22, 23, and 24. Filters 22 and 23 are wide band pass filters and filter 24 is a narrow band pass filter and passes only the frequency produced by oscillator 20. The output of filter 22 is connected to frequency to DC converter 25. The output of converter 25 is connected to the non-inverting input of amplifier 28. The inverting input 28 is connected to the wiper of potentiometer 15 which is operated by motor 12 which also drives stylus 1 in the x-direction (stylus not shown in FIG. 4). Amplifier 28 drives motor 12. In a similar manner, output signals from frequency to DC converter 26 are connected to the non-inverting input of amplifier 29. The inverting input of amplifier 29 is connected to the wiper of potentiometer 16 which is operated by motor 13 which also drives stylus 1 in the y-direction. Amplifier 29 drives motor 13. Output signals from filter 24 are amplified and detected by amplifier-detector 27 and are applied to solenoid 14 which operates stylus 1 in the z-direction.

Operation of the system is as follows: The record - reproduce device is switched to the record mode (connections as shown in FIG. 3) and the operator (lecturer) speaks into microphone 8 and at the same time draws up sketches or figures by manipulating stylus 1, and writing on paper 3 which was previously affixed to the device. Moving the stylus in the x-direction, potentiometer 15 is operated which produces a voltage corresponding to the position of the stylus in the x-direction. The voltage at the wiper of potentiometer 15 is fed to voltage controlled oscillator 18 which produces a frequency corresponding to the position of the stylus in the x-direction. Similarly, moving the stylus in the y-direction, potentiometer 16 is operated which produces a voltage corresponding to the position of the stylus in the y-direction. The voltage at the wiper of potentiometer 16 is fed to voltage controlled oscillator 19 which produces a frequency corresponding to the position of the stylus in the y-direction. To commence writing, stylus 1 is pressed downward (z-direction) so as to make contact with paper 3. When this is done, microswitch 17 is actuated and oscillator 20 is turned "on". Signals from voltage controlled oscillators 18 and 19 and from oscillator 20 are combined and recorded on one channel of tape recorder 5. Sound waves impinging on microphone 8 are amplified by amplifier 21 and are recorded on a second channel of tape recorder 5.

To reproduce the recorded sound and sketches or diagrams, the device is switched to the reproduce mode (connections as shown in FIG. 4). Signals from the voice channel of the tape recorder 5 are amplified by amplifier 30 and are reproduced by loudspeaker 31. Signals corresponding to the graphic information recorded, coming out from the other channel of the tape recorder, are sorted out by filters 22, 23 and 24. Filter 22 separates signals which were originally produced by voltage controlled oscillator 18 and which correspond to the x-position of the stylus. Filter 23 separates signals which were originally produced by voltage controlled oscillator 19 and which correspond to the y-position of the stylus. Filter 24 separates signals which were originally produced by oscillator 20 and which correspond to the z-position of the stylus. Signals out of filter 22 are fed to frequency-to-DC converter 25. The DC voltage out of frequency-to-DC converter 25 is compared with the voltage produced by potentiometer 15 at the input of amplifier 28 and the difference signal amplified and applied to motor 12 which drives stylus holder 2 in the x-direction and potentiometer 15 until the two voltages at the input of amplifier 28 are equal. In a similar way, signals out of filter 23 are applied to frequency-to-DC converter 26, the output of which is compared with the voltage produced by potentiometer 16 at the input of amplifier 29 and the difference is amplified and applied to motor 13 which drives stylus holder 2 in the y-direction and potentiometer 16, until the two signals at the input to amplifier 29 are equal. Signals out of filter 24 are amplified and detected by amplifier-detector 27 and the resultant DC voltage is applied to solenoid 14 which is energized any time there is a signal at the output of filter 24. Solenoid 14 moves stylus 1 in the z-direction so as to make contact with paper 3. In this arrangement, when the tape recorder reproduces the pre-recorded signals, the stylus acquires exactly the same x, y, and z positions to which the operator (lecturer) previously moved the stylus during the recording process, and the stylus will reproduce on the affixed paper the same figures and sketches which the operator recorded. At the same time, the loudspeaker reproduces the recorded voice.

In the device described above, during the recording process, the x and y drive motors 12 and 13 respectively are not energized, but they are mechanically connected to the stylus support. This increases the friction during movement of the stylus and it makes it difficult for the operator to use the stylus to write. To eliminate this difficulty, the motors can be used to assist in the manipulation of the stylus. To achieve this, sensitive switches are attached to the stylus holder and arranged in such a way as to operate one switch as soon as the stylus is slightly moved in the x-direction and another switch when the stylus is moved slightly in the y-direction. When the record-reproduce device is in the record mode, these switches operate the x and y drive motors in such a way as to assist in moving the stylus.

Figure 5:
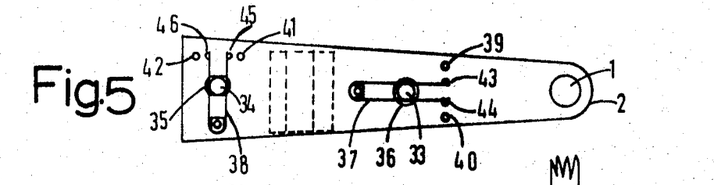
FIG. 5 shows the top view of the stylus holder and switch arrangement.
Figure 6:
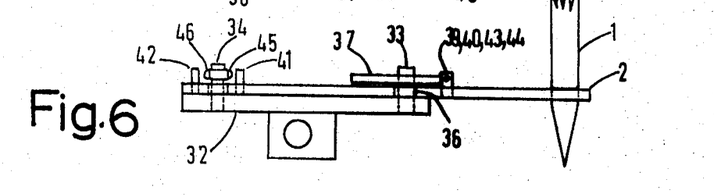
FIG. 6 is a side view of FIG. 5.

FIGS. 5 and 6 show a modification to the stylus holder to implement the switching arrangement mentioned above. Stylus holder 2 is supported on a sub-member 32 by pins 33 and 34. These pins protrude through slots 35 and hole 36 which are cut in stylus holder 2. The diameter of hole 36 is larger by several thousandth of an inch than the outer diameter of pin 33. The width of slot 35 is only slightly larger than pin 34. Affixed to the stylus holder are microswitches comprising "U"-shaped springs 37 and 38, and contacts 39, 40, 41, 42. The closed ends of "U"-shaped springs 37 and 38 are affixed to stylus holder 2 and bear a set of contacts at their open ends 43, 44, 45, 46. Contacts 39, 40, 41 and 42 are also affixed to stylus holder 2. The arrangement of the stylus holder and microswitches is such, that when the operator, during the record process, pushes stylus 1 in the positive x-direction, stylus holder 2 rotates slightly with respect to sub-member 32 about pin 34 and one leg of "U"-shaped spring 37 is pushed by pin 33, contact 43 touches contact 39, thus completing the circuit. Completion of this circuit energizes motor 12 which is arranged to turn in such a direction as to assist the operator in moving the stylus. Similarly, when the operator pushes the stylus in the negative x-direction, pin 33 pushes the other leg of spring 37 and contact 44 touches contact 40, thus completing the circuit. Completion of this circuit causes motor 12 to turn in the opposite direction and assist the operator in moving the stylus in the negative x-direction. In the same way, when the operator pushes the stylus in the y-direction, stylus support 2 slides over support member 32 and pin 34 moves in slot 35 and pushes one leg of "U"-shaped spring 38 and contact 46 touches contact 42, thus completing a circuit. Completion of this circuit energizes motor 13 which turns in such a way as to assist the operator move the stylus in the positive y-direction. Similarly, when the operator pushes the stylus in the negative y-direction, pin 34 pushes the other leg of "U"-shaped spring 38 and a circuit is completed through contacts 45 and 41. Completion of this circuit causes motor 13 to turn in the opposite way and again assist the operator in moving the stylus in the negative y-direction.

Figure 7:
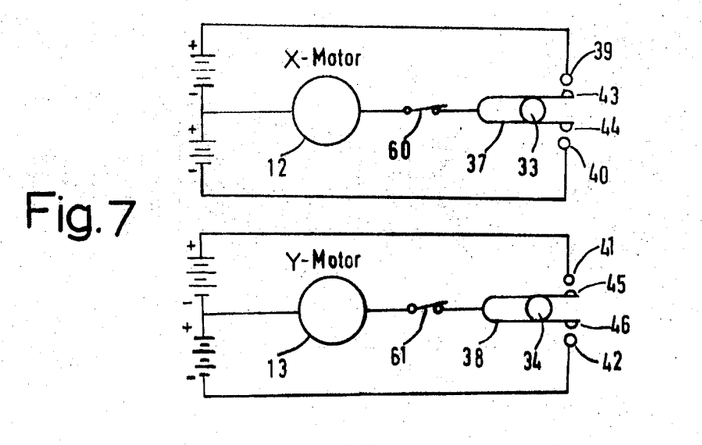
FIG. 7 shows the electrical connections of the stylus switches and the drive motors.
Figures 8, 9:
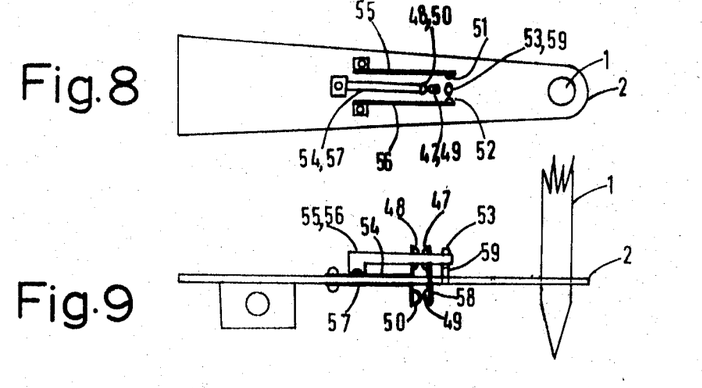
FIG. 8 shows a top view of the stylus holder of FIG. 5 with alternate arrangement of switches.
FIG. 9 is a side view of FIG. 8.

Another arrangement of the switches on the stylus holder is shown in FIGS. 8 and 9. In this arrangement, the stylus holder is made of a flexible material and the switches are arranged to respond to flexure of the stylus holder. Two contacts, 47 and 49, are supported by pin 58 which is affixed to stylus holder 2 as shown. Contacts 48 and 50 are supported by members 54 and 57, respectively. Members 54 and 57 are affixed to stylus holder 2 at their ends opposite contacts 48 and 50. Contact 53 is supported by pin 59 which is affixed to stylus holder 2. Contacts 51 and 52 are supported by members 55 and 56, respectively. Supports 55 and 56 are affixed to stylus holder 2 at their ends opposite contacts 51 and 52. The arrangement is such, that when stylus 1 is pushed in the positive x-direction, stylus holder 2 twists and contact 53 touches contact 52. When stylus 1 is pushed in the negative x-direction, stylus holder 2 twists in the other way and contact 53 touches contact 51. In a similar way, when stylus 1 is pushed in the positive y-direction, stylus holder 2 bends downward, causing contact 49 to touch contact 50. When stylus 1 is pushed in the negative y-direction, stylus holder 2 bends upwards causing contact 47 to touch contact 48. Contacts 51, 52 and 53 are connected in the same way as contacts 39, 40, 43 and 44 and energize motor 12 when the stylus is pushed in the x-direction. Contacts 47, 48, 49 and 50 are connected in the same way as contacts 41, 42, 45 and 46 and energize motor 13, when the stylus is pushed in the y-direction. (See also FIG. 7).

Although I have demonstrated above how switches can be used to sense the direction in which the operator pushes the stylus, and to energize the motors in such a way as to assist in moving the stylus, it is easily seen that other types of transducers can be used to perform the same function.

When using this device, it is convenient to disable one of the sensing switches on the stylus support, in order to facilitate the drawing of straight lines in the x or y directions. FIG. 1 shows two push button switches 60 and 61. These switches are of the normally closed type and they are connected as shown in FIG. 7. Depressing switch 60 disables the motor assist feature in the x-direction, and the stylus moves freely in the y-direction but not in the x-direction. In this way, the operator can draw easily a straight line in the y-direction as if assisted by a ruler. In a similar way, depressing switch 61 enables the operator to draw a straight line parallel to the x-axis.

Figure 10:
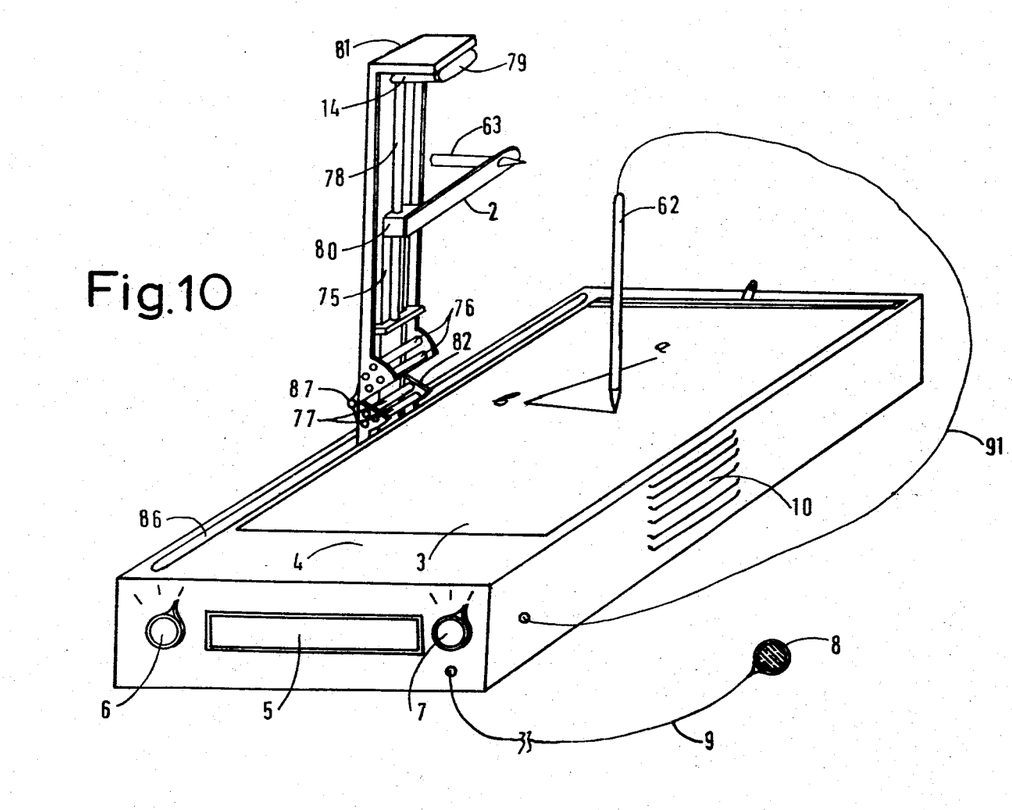
FIG. 10 is a second version of the record - reproduce device shown in FIG. 1.
Figure 11:
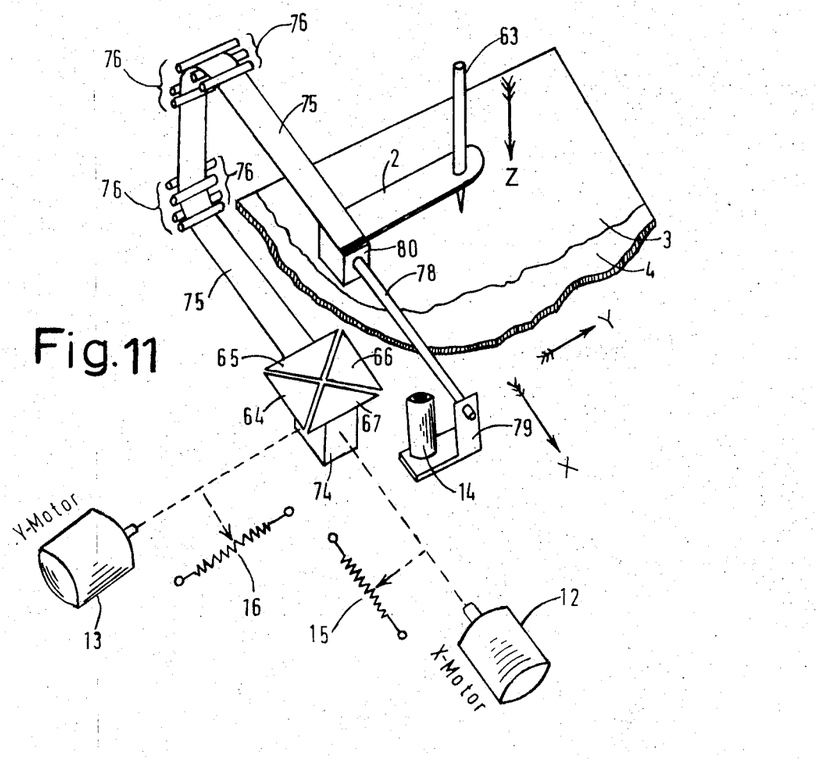
FIG. 11 shows diagrammatically the mechanism which drives the stylus and potentiometers of the device shown in FIG. 10.
Figure 15:
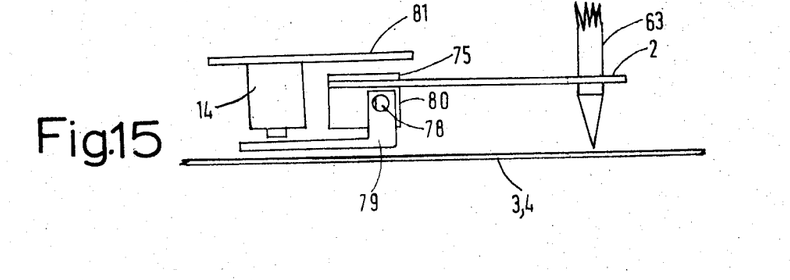
FIG. 15 shows how the solenoid drives the stylus in the device of FIG. 10.
Figure 16:
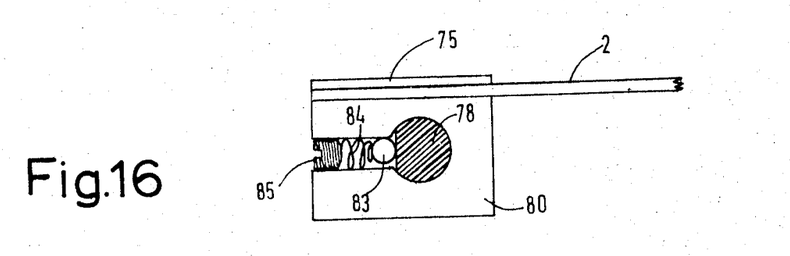
FIG. 16 shows the stylus holder and support member in detail.

A variation of the record-reproduce device shown in FIG. 1 and described above, is the record-reproduce device shown in FIG. 10. Here two styli are used, one for recording, stylus 62, and one for reproducing, stylus 63. When recording, reproduce stylus 63 and its associated assembly swings away from paper 3, as shown in FIG. 10, and record stylus 62 is used to write on paper 3. A wire is attached to the record stylus which connects it to a single generator internal to the device. An automatic system in the device, sensitive to signals from the signal generator, follows the record stylus and operates potentiometers 15 and 16. The automatic system, when the device is in the reproduce mode of operation, is made to respond to the tape recorded signals and operates the reproduce stylus 63. A more detailed description of the modified record-reproduce device follows (Please refer to FIGS. 10, 11, 12, 13 and 14):

The top of the device is made of a thin sheet of dielectric material 4. A sheet of paper 3 is affixed on top of sheet 4. Underneath sheet 4 a set of electrodes 64, 65, 66 and 67 are attached to an insulator plate 72 which in turn is supported by support member 74. Support member 74 is arranged by means of linkages to be driven in the x-direction by motor 12 and in the y-direction by motor 13. Motors 12 and 13 are also arranged to operate potentiometers 15 and 16, respectively. Also attached to support member 74 is a curved flexible ribbon 75 (similar to the steel ribbon used in tape measures) which is supported by rollers 77 and 76. Rollers 77 and 76 are arranged on each side of the ribbon so as to guide the ribbon in the shape of a "U" around dielectric sheet 4 and paper sheet 3. Attached to the other end of the flexible ribbon is a support member 80 which is arranged to slide on shaft 78. Attached to support member 80 is one end of stylus holder 2 which supports record stylus 63. Rollers 77 are rotatably attached to member 82 (FIG. 10) Member 82 is attached by some means so as to move with support member 74 in the y-direction only. Member 82 protrudes through a slot 86 on the side of dielectric sheet 4 as shown in FIG. 10. Attached to member 82 via a hinge 87 is member 81. Rollers 76 are rotatably attached to member 81. Shaft 78 is also rotatably attached to member 81. Affixed to one end of shaft 78 is an "L"-shaped member 79 (FIGS. 11 and 15). In proximity to member 79 is solenoid 14 which is attached at one end to member 81. Solenoid 14, member 81 and shaft 78 are arranged so that when solenoid 14 is energized it attracts member 79, which in turn causes shaft 78 to rotate slightly. Shaft 78 is flattened along its length as shown in FIG. 16. A ball 83 riding in a hole bored in member 80 is pressed against the flat surface of shaft 78 by spring 84 and a set screw 85. This arrangement allows member 80 to slide along shaft 78 and at the same time, when shaft 78 rotates, as a result of energization of solenoid 14, member 80 rotates with shaft 78 and thus stylus 63 is lowered on paper 3. The arrangement described above allows member 81 to swing away from the top of the device while recording, as shown in FIG. 10, and back on top of the device when reproducing, while reproduce stylus 63 is still mechanically linked to motors 12 and 13. A switch (not shown) can be made to operate with the movement of member 81 when it is moved from the horizontal to the vertical position and switch the device from the reproduce mode of operation to the record mode.

Figure 17:
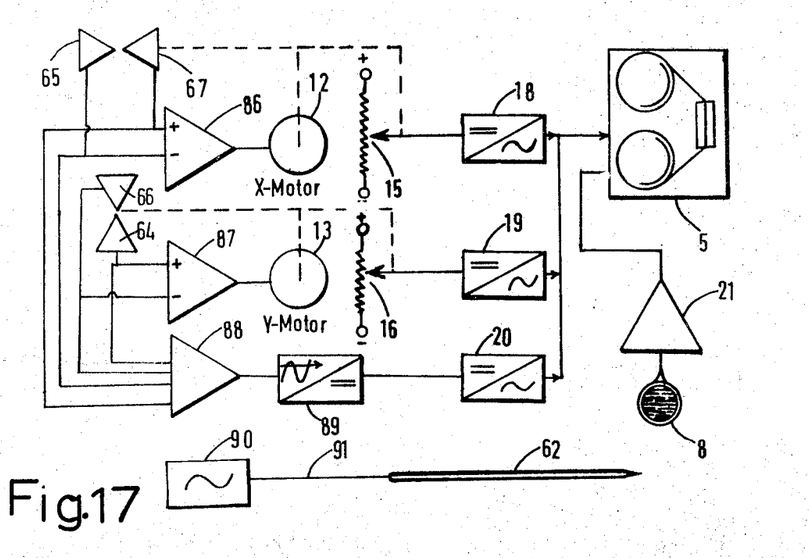
FIG. 17 shows the electrical connections of the device of FIG. 10 when operating in the record mode.

FIG. 17 shows the electrical connections of the device in the record mode of operation. Electrodes 65 and 67 are connected to the input of comparator amplifier 86 which produces an output voltage proportional to the difference between its two input signals. Comparator amplifier 86 drives motor 12 which is arranged to drive electrode assembly (electrodes 65, 67, 66 and 64) and support member 74 (not shown in FIG. 17) in the x-direction. Motor 12 also drives potentiometer 15. Similarly, electrodes 66 and 64 are connected to comparator amplifier 87 which is identical to comparator amplifier 86 and which drives motor 13. Motor 13 is arranged to drive the electrode assembly and support member 80 in the y-direction. Motor 13 also drives potentiometer 16. Electrodes 65, 67, 66 and 64 are also connected to summing amplifier 88 of which the output is proportional to the sum of the absolute value of its input signals. The output of summing amplifier 88 is connected to threshold control unit 89 which produces an output voltage only when the input voltage exceeds a pre-set value. The output of threshold control unit 89 is used to turn oscillator 20 "on", any time there is a signal at the output of threshold control unit 89. Signal generator 90 produces a signal which is transmitted to record stylus 62 via cable 91. Voltage controlled oscillators 18 and 19 and oscillator 20 produce signals which are recorded on one channel of tape recorder 5. Amplifier 21 which amplifies signals from microphone 8 is connected to a second channel of tape recorder 5.

Operation of the device shown in FIG. 10, when switched to the record mode of operation is as follows:

The operator (lecturer) speaks into the microphone and his voice is recorded on one channel of tape recorder 5. At the same time, he uses the record stylus to write figures and sketches on paper 3. As he writes, signals from the stylus are capacitively coupled to electrodes 64, 65, 66 and 67. Signals picked up by electrodes 65 and 67 are compared by comparator amplifier 86 and, if not equal, an output voltage is present at the output of comparator amplifier 86 which causes motor 12 to turn and drive electrode support member 74 and electrodes in such a direction as to bring electrodes 65 and 67 equidistant from stylus 62, in which case the two signals picked up by electrodes 65 and 67 become equal and comparator amplifier 86 ceases to produce an output voltage and the motor stops turning.

In a similar manner, electrodes 64 and 66 in conjunction with comparator amplifier 87 and motor 13 are aligned automatically so as to be equidistant from stylus 62. In this arrangement, therefore, while the operator writes on paper 3 with record stylus 62, electrodes 65, 66, 67, and 64 automatically follow the record stylus. Signals picked up by electrodes 64, 65, 66 and 67 are fed to summing amplifier 88 which produces an output signal proportional to the signal strength picked up by the electrodes. The strength of the signal received by the electrodes depends on the proximity of the stylus to the electrodes. The farther away the stylus is from the electrodes, the weaker will be the signal picked up by the electrodes and the less the signal at the output of summing amplifier 88. Threshold control unit 89 is adjusted so that when the operator lifts the record stylus off the paper, the threshold control unit stops producing an output signal and oscillator 20 stops oscillating. While motors 12 and 13 drive the electrodes so as to be continuously aligned with the record stylus, the motors also drive potentiometers 15 and 16. The voltages produced at the wipers of the potentiometers control voltage controlled oscillators 18 and 19. Signals from voltage controlled oscillators 18 and 19 and oscillator 20 are recorded on one channel of tape recorder 5.

In the reproduce mode, the electrical connections of the device are the same as the connections shown in FIG. 4, and its operation is the same as previously described. In this case, motors 12 and 13 drive the reproduce stylus 63 via support member 74, flexible ribbon 75, support member 80 and stylus holder 2, as shown in FIG. 11. Solenoid 14 drives reproduce stylus 63 in the z-direction via "L" shaped member 79, support member 80, shaft 78 and stylus holder 2, as previously explained.

Figure 12:
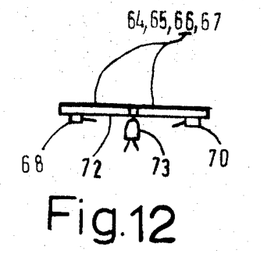
FIG. 12 is a side view of the sense electrode assembly in the device shown in FIG. 10.
Figure 13:
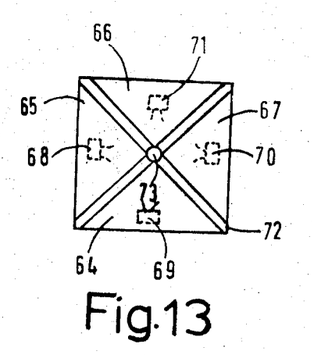
FIG. 13 is a top view of FIG. 12.
Figure 14:
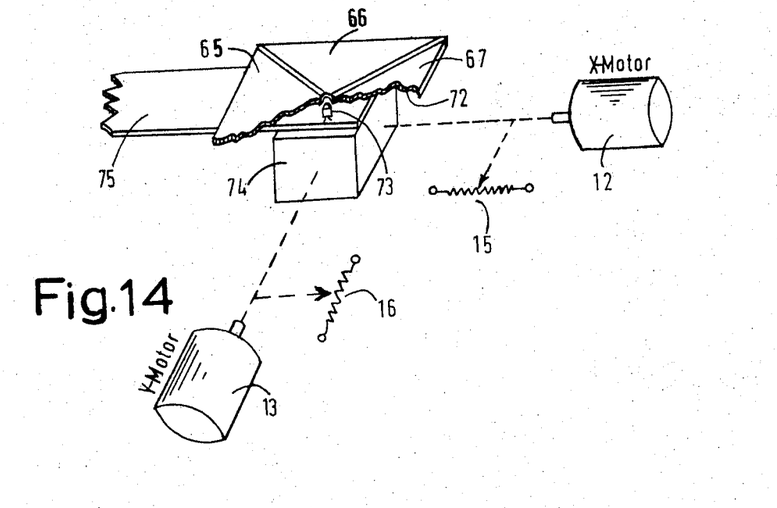
FIG. 14 shows diagrammatically the mechanism which drives the electrode assembly.

The record - reproduce device shown in FIG. 10 and described above has some inherent difficulties in implementation. One such difficulty is when the operator commences writing, the position of the electrode assembly may be too far from the position of the record stylus, and signals from the record stylus picked up by the electrodes may be too weak to operate the automatic follow-up system. To eliminate this problem, dielectric sheet 4 is made of some translucent material and a light source 73 is affixed under electrode support plate 72 (FIGS. 12, 13, and 14). Electrode support plate 72 has a hole, as shown, so that a small amount of light could shine through it. The light is transmitted through the translucent dielectric sheet 4 and through paper 3, visible to the operator. Thus, before beginning to write, the operator can bring his stylus close to the light, so that the electrodes can pick up enough signal to operate the device. Then, without touching it, but close enough to the paper, he can bring his stylus where he wants to start writing.

Another difficulty in implementing the device shown in FIG. 10 is the fact that the capacitive coupling between the stylus and electrodes is very small. In order to induce large enough signals into the electrodes, the cables carrying the signals to the comparator amplifiers as well as the input terminals of the comparator amplifiers must have very high impedance. The capacitive reactance of the cables with respect to ground is appreciable because these cables have to be fairly long. To eliminate this difficulty, high input impedance - low output impedance elements 68, 69, 70, 71 (shown in FIGS. 12 and 13), such as field effect transistors, may be mounted on the electrode assembly. These elements are connected to the electrodes and and drive the camparator amplifiers.

Figure 18:
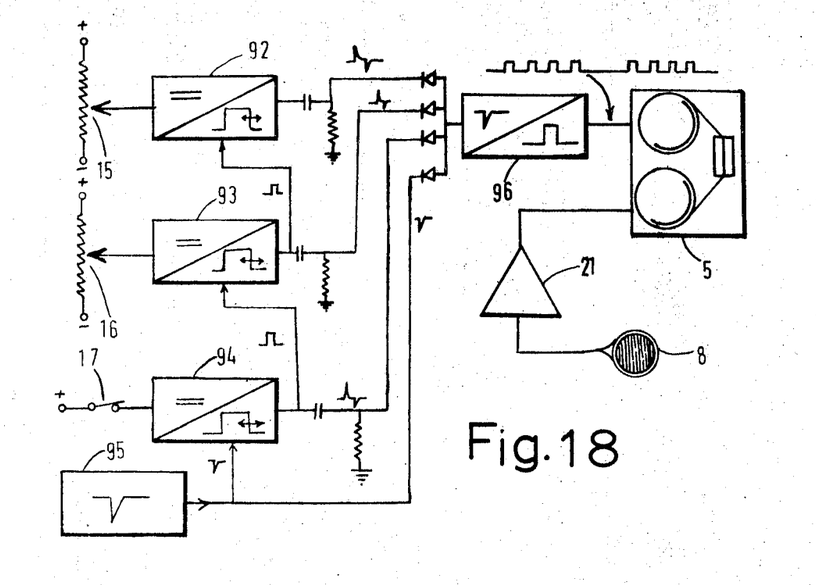
FIG. 18 shows alternate electrical connections which apply to the device shown in FIG. 1, as well as to the device shown in FIG. 10, when operating in the record mode.

In the record - reproduce device shown in FIG. 1 and associated drawings and in the modified device shown in FIG. 10 and associated drawings, DC voltages produced by potentiometers 15 and 16 and switch 17 are converted to voltages of varying frequency in order to be recorded on magnetic tape. In the reproduce process, the variable frequency frequency voltages are changed back to DC voltages. This method requires filters, sinewave oscillators, frequency to DC converters and linear voltage controlled oscillators, which could be quite complicated and relatively expensive. Another way of processing the DC voltages produced by potentiometers 15 and 16 for recording on tape and reproducing is a method illustrated in FIGS. 18 and 19. In this method, DC voltages from potentiometers 15 and 16 are used to control the pulse width of voltage controlled monostable multivibrators 92 and 93. Also, switch 17, which is operated by lowering the record stylus, changes the voltage on voltage controlled monostable 94. A trigger generator produces a negative pulse which triggers monostable 94. Monostable 94 produces a pulse which is used to trigger monostable 93. Monostable 93 triggers on the trailing edge of the pulse. The output of monostable 93 is used to trigger monostable 92 which also triggers on the trailing edge of the pulse. In this way, the pulses out of the three monostables occur in sequence. Output pulses from the monostables 92, 93 and 94 are differentiated to produce a sharp positive pulse and a sharp negative pulse. Diodes are used to pass only the negative pulses as shown. The sharp negative pulses and the pulse produced by the trigger generator 95 are used to trigger monostable multivibrator 96. In this manner, monostable 96 produces a series of pulses any time trigger generator 95 produces a pulse. Also, the time interval between the leading edges of two adjacent pulses in the pulse train depends on the DC voltage applied to the corresponding multivibrator. The time interval between the last pulse in a train of pulses and the first pulse in the next train of pulses is adjusted by adjusting trigger generator 95 to be several times the time interval between adjacent pulses in a train. The reason for this will be apparent later. The pulses out of monostable 96 are recorded on one channel of the tape recorder and voice signals are recorded on the other channel, as before. When the device is switched to the reproduce mode of operation (FIG. 19), voice signals out of one channel of tape recorder 5 are applied to loudspeaker 31 via amplifier 30, as before. The pulses coming out of the other channel of the tape recorder are applied to decoder 97. Decoder 97 consists of a sensing circuit which senses the leading edge of the first pulse of each train, and a shift register which resets on the leading edge of the first pulse of each train and shifts on the leading edge of each pulse in the train. In this way, three pulses come out of three outputs of the decoder, the widths of which correspond to the time interval between the leading edge of one pulse in the train and the leading edge of the following pulse in the train. In other words, the widths of the pulses out of decoder 97 correspond to the widths of pulses generated by monostables 92, 93 and 94 during the record process. The pulse out of decoder 97, corresponding to the z-movement of the stylus (switch 17), is fed to a pulse width discriminator 102 which produces an output voltage when the pulse width corresponds to switch 17 being closed. The output of pulse width discriminator 102 drives solenoid 14 via amplifier 103, which, when energized, lowers the stylus on the paper. The other two pulses out of decoder 97 are used to operate motors 12 and 13 as follows: The leading edge of each of these pulses is used to trigger voltage controlled monostable multivibrators 92 and 93. The pulses produced by these monostables are fed to pulse width comparators 98 and 100. These comparators compare the widths of pulses out of monostables 92 and 93 with the pulses which trigger them. The output of pulse width comparators 98 and 100 is a voltage which is proportional to the difference in pulse width of the input pulses. The output voltage is either positive or negative, depending on which pulse at the input of the comparator is the widest. Output voltages out of comparators 98 and 100 are used to drive motors 12 and 13, respectively, via amplifiers 99 and 101. If there is a difference in pulse width between the pulses fed to comparators 98 and 100, the motors drive potentiometers 15 and 16, which alter the DC voltage supplied to monostables 92 and 93 and adjust their output pulses to become the same in width as their corresponding pulses out of decoder 97. Note here that in this arangement, the same voltage controlled monostable multivibrators 92 and 93 are used during the recording as during the reproducing mode of operation. This is done purposely, to eliminate any non-linearities which may exist between control voltage and pulse width in these multivibrators.

It is possible to record both the signals corresponding to graphic information and signals corresponding to voice on a single tape recorder channel. This can be achieved by using one part of the spectrum available in the tape recorder channel to record the voice signals, and another part of the available spectrum to record signals corresponding to graphic information.

Another variation of the record - reproduce device is to have the device as described above without the tape recorder, and instead, provide terminals on the device where an external tape recorder may be used.

In the device shown in FIG. 1 and described above, and in the modified device shown in FIG. 10, potentiometers 15 and 16 are used to produce signals corresponding to the $x$ and $y$ positions of the stylus and a switch is used to serve the $z$-position of the stylus. It is possible to use other types of transducers which convert mechanical displacement into electrical signals or voltages.

In the device shown in FIG. 10 and decribed above, it is possible to make the signal generator, which energizes record stylus 62 small enough to be mounted inside the stylus. This signal generator can be operated from a small battery, also mounted inside the stylus, thus eliminating interconnecting cable 91.

Since an ordinary entertainment-type tape recorder and an ordinary entertainment-type record player have similar band widths, it is possible to provide the necessary circuits in the device shown in FIG. 1 or FIG. 10 and described above, so that the device can reproduce compatible signals from a phonograph record. Such phonograph records can be made by using as a master copy a magnetic tape recorded on one of the record - reproduce devices described above or by recording directly on a master phonograph record.

Another application of the device described above is in the field of entertainment where recorded voice, music and drawings or sketches can be combined to make up stories for children. In this case recordings are made on phonograph records and played on a record player which is connected to a record - reproduce device as described above having means for accepting signals from phonograph records.

Figure 19:
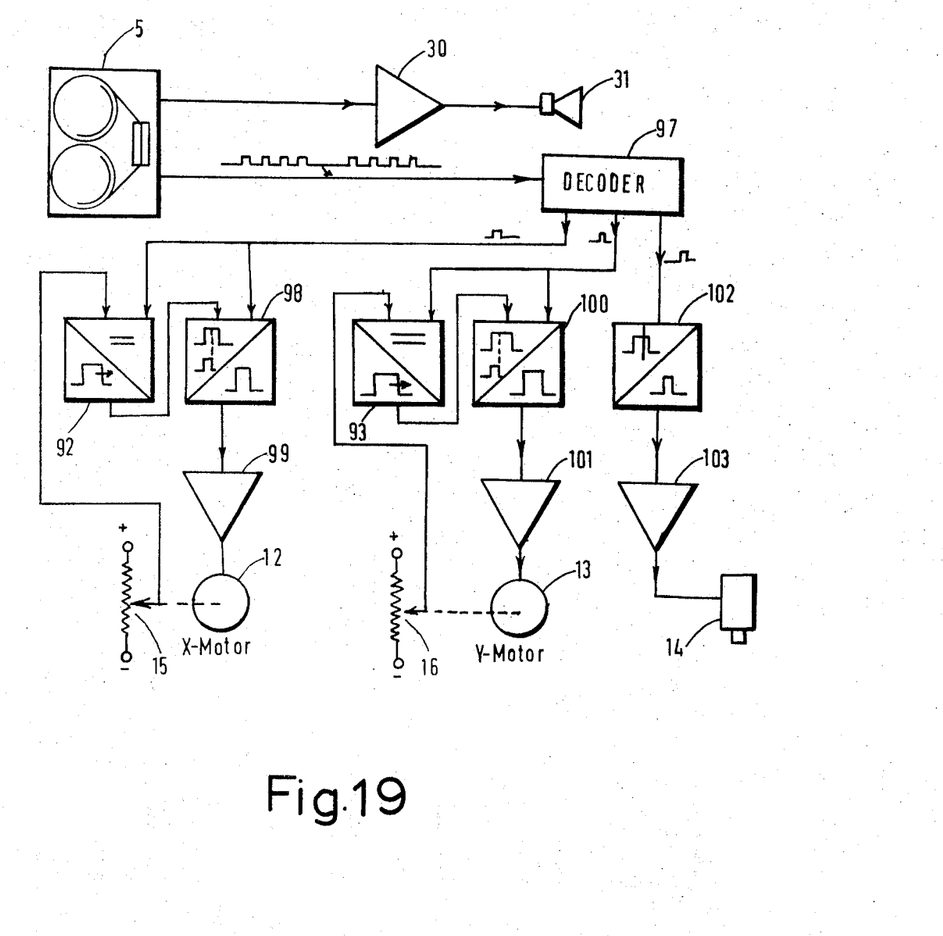
FIG. 19 shows alternate electrical connections which apply to either of the devices operating in the reproduce mode.

Yet another application of the device described above is to use two such devices for telecommunication. To achieve this, the frist device is operating in the record mode of operation and the second one in the reproduce mode of operation and they are interconnected by lines so that the combined signals produced by voltage controlled oscillator 18, voltage controlled oscillator 19, and oscillator 20 (FIG. 3) of the first device or the signals out of monostable 96 (FIG. 18) of the first device are connected to the inputs of filters 22, 23 and 24 (FIG. 4) of the second device or connected to the input of decoder 97 (FIG. 19) of the second device depending on which version of the device is used. Similarly, the output of amplifier 21 (FIG. 3 or FIG. 18) of the first device is connected to the input of amplifier 30 (FIG. 4 or FIG. 19). In this way signals from the first device are received by the second device in real time and one person can send voice and graphic information to another person over a distance. Of course, it is possible to provide means of multiplexing the graphic and voice signals and use a single wire line (two conductors) to interconnect the two devices.

The embodiments of the invention in which an exclusive property or privilege is claimed are defined as follows:

1. A device for recording and reproducing information comprising:
    a. a plate of dielectric material on which writing paper may be affixed;
    b. a record stylus for writing graphic information, said stylus being energized by a signal generator so as to produce an electric field in the vicinity of its writing end;
    c. a moveable electrode assembly located underneath said dielectric plate, said electrode assembly being arranged to sense said electric field produced by said record stylus;
    d. a servo system operable in a record mode or a playback mode and arranged to move said electrode assembly in response to said electric field induced in said electrode assembly by said record stylus when in said record mode of operation and thus causing said electrode assembly to follow movements of said record stylus while writing on said paper;
    e. transducers connected to said servo system via linkages and arranged to produce electrical signals corresponding to positions of said electrode assembly;
    f. a reproduce stylus connected to said servo system via linkages and arranged to write on said paper in response to signals received by said servo system when operating in said playback mode;
    g. means for processing said signals produced by said transducers into a form suitable for storage on magnetic tape and means for processing signals from said magnetic tape into suitable form for driving said servo system;
    h. a tape recorder for recording and reproducing said signals corresponding to movements of said record stylus;
    i. means for sensing the lifting of said record stylus off said paper in the process of writing by sensing the intensity of said electric field induced in said electrode assembly and means for producing a signal corresponding to the lifting of said record stylus which is suitable for recording on magnetic tape.

2. A device according to claim 1 in which said electrode assembly consists of a number of electrical conductors insulated from each other and supported by an insulated member.

3. A device according to claim 1 in which said plate of dielectric material is translucent and in which said electrode assembly is provided with a light source, said light source being arranged to transmit light through said dielectric plate and said paper.

4. A device according to claim 1 in which amplifying elements having high input impedance and low output impedance are used, said elements being mounted on said moveable electrode assembly and said elements being arranged to amplify signals induced in said electrode assembly.

5. A device according to claim 1 in which said transducers which produce signals corresponding to the movement of the record stylus are potentiometers.

6. A device according to claim 1 in which said means for processing said signals produced by said transducers consist of electronic circuitry which produces trains of pulses such that the time interval between said pulses corresponds to positions of said electrode assembly.

7. A device according to claim 1 in which said means for processing said signals produced by said transducers consist of electronic circuitry which produces AC voltages the frequency of which corresponds to the position of said electrode assembly.

8. A device according to claim 1 in which said reproduce stylus is mechanically connected to said servo system by a flexible ribbon capable of transmitting tensional as well as compressional forces, said flexible ribbon being guided by rollers.

9. A device according to claim 1 in which said tape recorder does not form part of said device and in which connectors are provided for driving said device from an external source.

* * * * *